Dec. 17, 1940.                R. R. RATLIFF                2,225,182
                     VEHICLE LOAD WEIGHING DEVICE
                       Filed Aug. 27, 1938          2 Sheets-Sheet 1

Inventor
REUBE R. RATLIFF

By
Edward V. Hardman
      Attorney

Dec. 17, 1940.    R. R. RATLIFF    2,225,182
VEHICLE LOAD WEIGHING DEVICE
Filed Aug. 27, 1938    2 Sheets-Sheet 2

Inventor
REUBE R. RATLIFF

Edward V. Hardaway
Attorney

Patented Dec. 17, 1940

2,225,182

UNITED STATES PATENT OFFICE 2,225,182

VEHICLE LOAD WEIGHING DEVICE

Reube R. Ratliff, Houston, Tex.

Application August 27, 1938, Serial No. 227,044

3 Claims. (Cl. 265—40)

This invention relates to a vehicle load weighing device.

An object of the invention is to provide means for weighing the load on a motor vehicle of such construction that the weight of the load carried by the vehicle may be, at any time, ascertained.

It is another object of the invention to provide load weighing means which may be readily installed on a motor vehicle and which will indicate the total amount of the load being carried irrespective of the distribution of the load on the vehicle.

It is a further object of the invention to provide a hydraulically operable, load weighing, or indicating, device adapted to be mounted on a yieldable support such as a vehicle body and which includes a pressure gauge and hydraulically operable means through which the weight of the load on the support may be indicated by said gauge.

The apparatus also includes a shock absorber provided to relieve the operating parts from road shocks to prevent breakage of parts.

With the above and other objects in view the invention has particular relation to certain novel features of construction, operation and arrangement of parts, an example of which is given in this specification and illustrated in the accompanying drawings, wherein:

Figure 5 shows an enlarged, fragmentary, sectional view taken on the line 5—5 of Figure 1.

Figure 1:
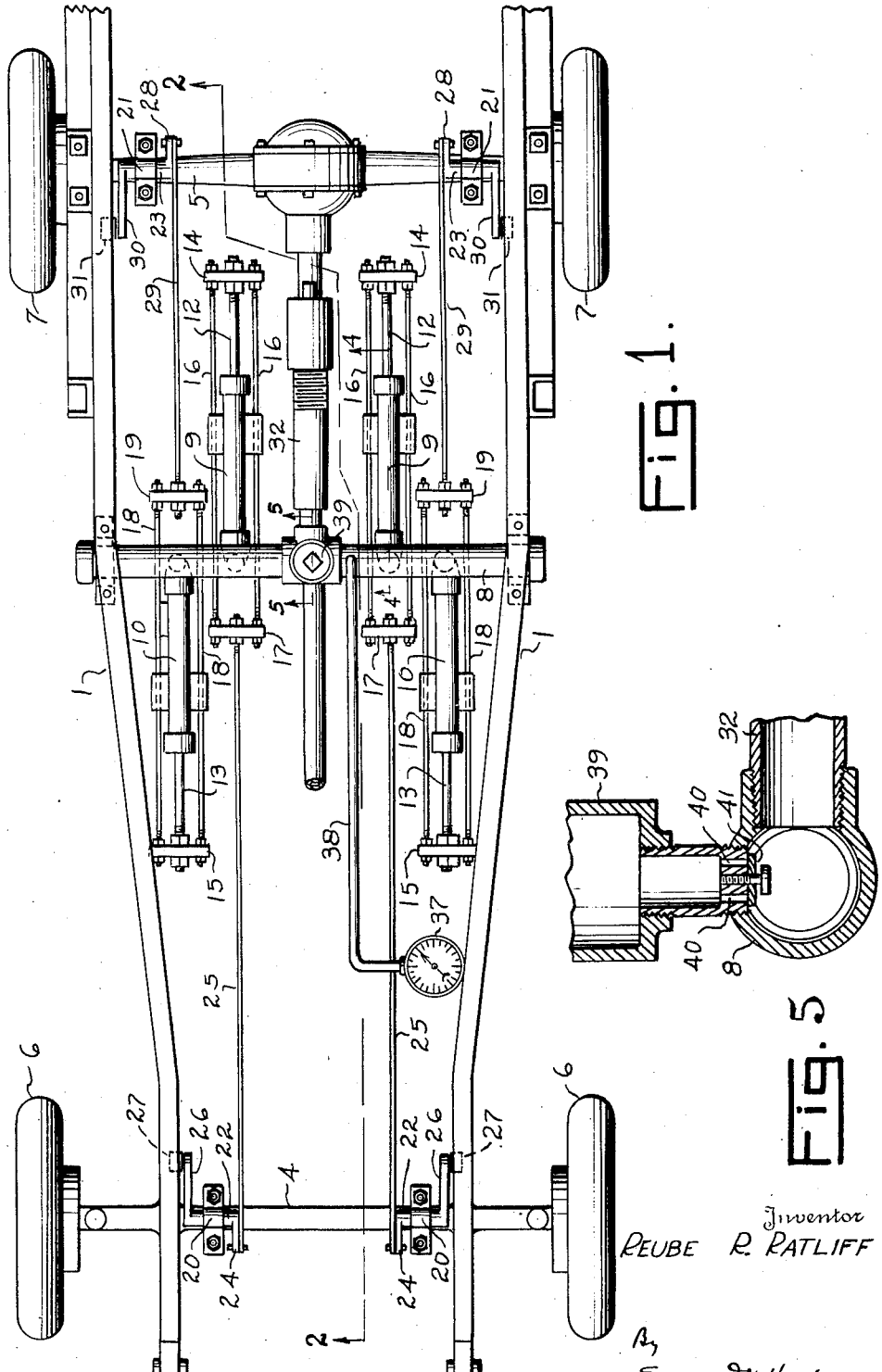
Figure 1 shows a plan view of a vehicle equipped with the weighing device.
Figure 2:
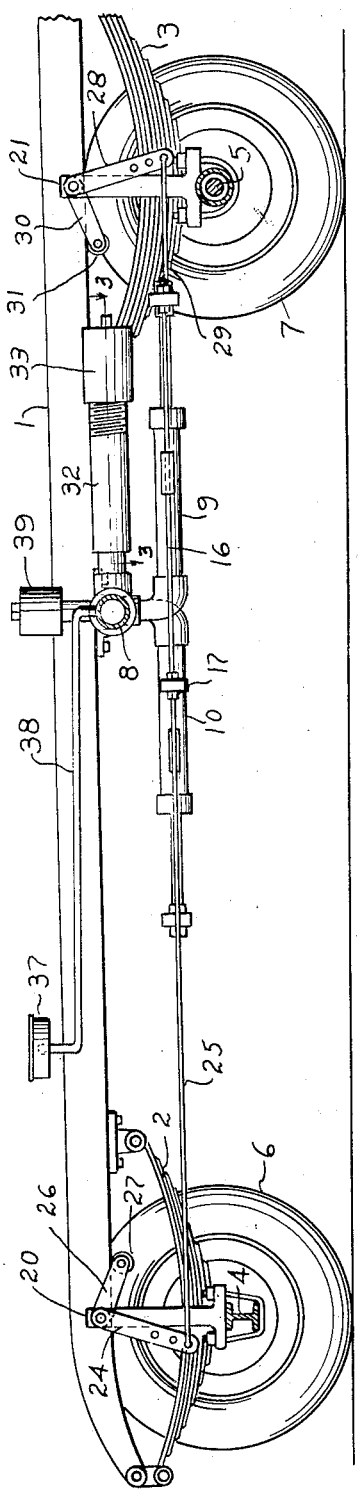
Figure 2 shows a longitudinal, sectional view taken on the line 2—2 of Figure 1.
Figure 4:
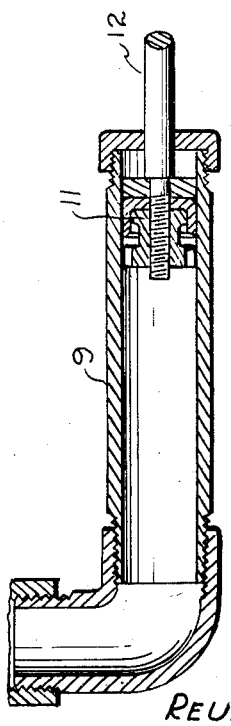
Figure 4 shows an enlarged, longitudinal, sectional view taken on the line 4—4 of Figure 1.
Figure 3:
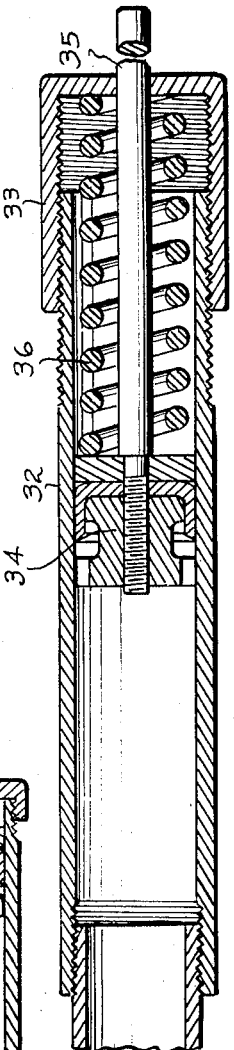
Figure 3 shows an enlarged, longitudinal, sectional view taken on the line 3—3 of Figure 1.

Referring now more particularly to the drawings wherein like numerals of reference designate the same parts in each of the figures, the numerals 1, 1 designate the side members of the vehicle chassis which are mounted on the front springs 2 and the rear springs 3 of the vehicle. These springs are supported on the front and rear axles 4, 5 which in turn are supported by the front wheels 6, 6 and the rear wheels 7, 7.

Attached to the side members of the chassis there is a transverse master cylinder 8. Connected into the cylinder 8 and extending rearwardly therefrom are the operating cylinders 9, 9 and connected into the cylinder 8 and extending forwardly therefrom there are the operating cylinders 10, 10. Each operating cylinder 9 and 10 has a piston 11 therein. Connected to these pistons are the rearwardly extending piston rods 12, 12 and the forwardly extending piston rods 13, 13 which work through the cylinder heads and to whose outer ends the respective yokes 14, 14 and 15, 15 are attached. Connected to the respective ends of the yokes 14 are the pairs of forwardly extended pull rods 16, 16. The forward ends of the respective pairs of pull rods 16 are connected to the yokes 17.

Connected to the respective ends of the yokes 15 and extending rearwardly therefrom are the pairs of pull rods 18, 18 the rear ends of the rods of these respective pairs being connected to the ends of the yokes 19, 19.

Clamped on the front axle 4 are the upstanding standards 20, 20 and clamped on the rear axle are the upstanding standards 21, 21.

Mounted in suitable bearings in the upper ends of these standards are the front crank shafts 22, 22 and the rear crank shafts 23, 23. On the inner ends of the crank shafts 22 are the depending arms 24, 24 to the free ends of which the forward ends of the tension rods 25, 25 are pivotally connected and the rear ends of these tension rods 25, 25 are connected to the respective yokes 17. The outer ends of the crank shafts 22 have the arms 26, 26 fixed thereon on whose free ends are mounted the rollers 27, 27 which ride against the undersides of the corresponding side members 1.

The inner ends of the crank shafts 23 have the depending arms 28, 28 to the free ends of which the rear ends of the tension rods 29, 29 are pivotally connected and the forward ends of these rods 29 are connected to the yokes 19. The outer ends of the crank shafts 23 have the arms 30, 30 fixed thereon whose free ends carry the rollers 31, 31 which ride against the undersides of the side members 1, 1.

Accordingly, upon downward movement of the chassis the crank shafts 22, 23 will be actuated to place the rods 16, 25 and 18, 29 under tension. Connected into the master cylinder 8 there is an equalizing cylinder 32. Its outer end carries the adjusting cap 33 which is screwed thereon and in the cylinder 32 there is a plunger 34 having a plunger rod 35 attached thereto which works through a central bearing in the cap 33 and between the plunger 34 and the cap 33 and surrounding the rod 35 there is a strong coil spring 36. The cylinders 8, 9, 10 and 32 are filled with an operating fluid such as oil which will be placed under compression in response to the tension on said tension rods. This compression will be concentrated in the cylinders 8, 32. There is a pressure gauge 37 which is connected, by means of the pressure line 38, into the cylinder 8. The tension on said tension rods, and consequently the compression on the operating fluid will be in response to the load carried by the vehicle and consequently the amount, or weight, of the load may be readily ascertained by an inspection of the gauge or meter 37.

In case of uneven distribution of the load on the vehicle chassis it is obvious that there may be more tension on some of the rods 25, 29 than on others and consequently, more initial pressure in some of the cylinders 9, 10 than others, but the pressure in the master cylinder 8 will be the average pressure of the total combined pressure in the cylinders 9, 10 so as to give a true reading of the total weight by the gauge 37.

The spring 36 is of a given compression resistance, which is varied according to carrying capacity of vehicle on which meter is to be used. As hydraulic fluid flows from small working cylinders, while vehicle is being loaded, into master and equalizing cylinders, 8 and 32, the spring 36, which is located in equalizing cylinder 32, is compressed in order to make room for the incoming fluid. The pressure under which this fluid is held is regulated by compression resistance of spring 36 and is reflected on dial of hydraulic gauge 37. Spring 36 also serves as a shock absorber which prevents damage to meter from road shocks while vehicle is in transit.

The compression resistance of spring 36 may be constant for vehicles of varying load capacities, provided different indicating pressure gauges be used that will either minimize or multiply the pressure in master and equalizing cylinders, according to the carrying capacity of vehicle on which meter is to be used.

On the cylinder 8 there is a reserve container 39 to carry a reserve supply of oil. Leading downwardly into the cylinder 8 are the ducts 40 normally closed by the downwardly opening valve 41 in the cylinder 8. In case of dissipation of the liquid in the cylinders an additional supply will from time to time drain down from the reserve supply 39 to keep the cylinders filled. This reserve supply may be replenished from time to time as required.

The drawings and description disclose what is now considered to be a preferred form of the invention by way of illustration only, while the broad principle of the invention will be defined by the appended claims.

What I claim is:

1. In combination a vehicle including a yieldably mounted chassis, a master cylinder, a plurality of operating cylinders connected into the master cylinder, an equalizing cylinder connected into the master cylinder, liquid filling said cylinders, means responsive to the influence of a load on the chassis and effective to apply pressure to the liquid in the operating cylinders and means responsive to said pressure and effective to indicate the amount thereof and the weight of the load on the chassis and a yieldably mounted plunger in the equalizing cylinder effective to maintain the liquid in the system under pressure.

2. In a load weighing device for a motor vehicle a piston and piston actuating unit comprising a horizontally disposed cylinder, a piston movable in the cylinder, an upstanding standard mounted on an axle of the vehicle, a bell crank mounted on the standard and having one end extending downwardly and the other end adjacent the frame of the vehicle, means for operatively connecting the frame and the end of the bell crank adjacent the frame, means for connecting the piston and the downwardly extending arm including a tension rod, the piston being moved by said bell crank and connecting means upon movement of the vehicle frame relative to the vehicle axle.

3. In combination a vehicle including a yieldably mounted chassis, a master cylinder, a plurality of operating cylinders connected into the master cylinder, an equalizing cylinder connected into the master cylinder, liquid filling said cylinders, means responsive to the influence of a load on the chassis and effective to apply pressure to the liquid in the operating cylinders and means responsive to said pressure and effective to indicate the amount thereof and the weight of the load on the chassis and a yieldably mounted plunger in the equalizing cylinder, effective to maintain the liquid in the system under pressure, and means for varying said pressure maintaining means to vary the pressure on the fluid.

REUBE R. RATLIFF.